June 13, 1933.  R. A. BEACH  1,913,654
DRINK MIXER
Filed Nov. 30, 1931
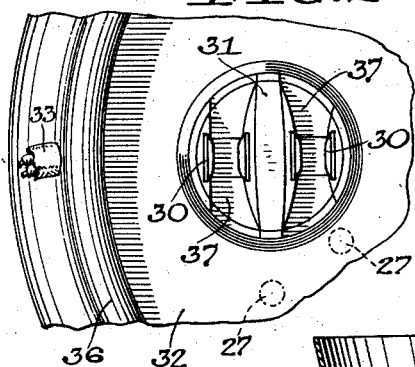
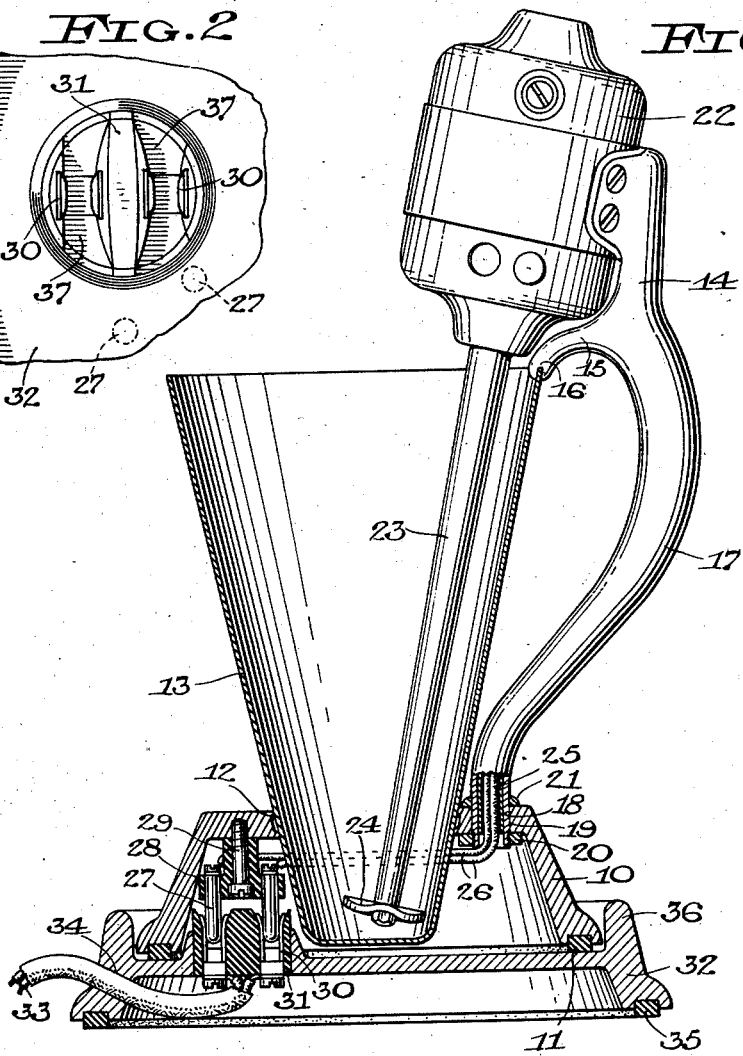
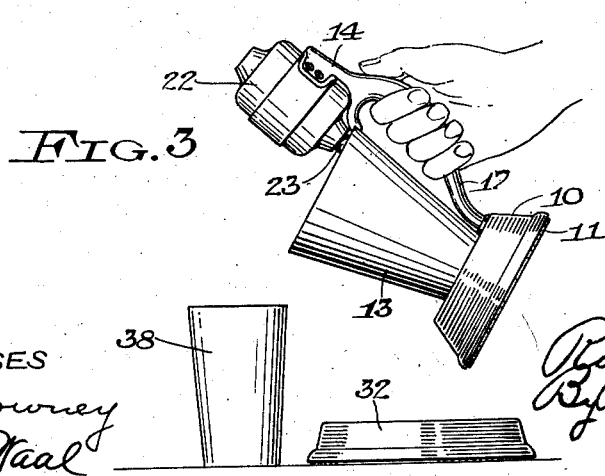
WITNESSES
M. E. Downey
C. L. Naal
INVENTOR
Royal A. Beach
By R. S. Caldwell
ATTORNEY Patented June 13, 1933

1,913,654

UNITED STATES PATENT OFFICE

ROYAL A. BEACH, OF RACINE, WISCONSIN

DRINK MIXER

Application filed November 30, 1931. Serial No. 577,979.

The invention relates to drink mixers, and has for an object the provision of a drink mixer in which the agitator and its driving motor are mounted in permanent relation to the mixing receptacle to form therewith a compact self-contained assembly which is handled as a unit for filling the receptacle and pouring its contents after mixing, the agitator being protected from mechanical injury by its permanent mounting within the receptacle and capable of being placed close to a side wall of the receptacle without danger of accidental contact therewith, thereby securing improved mixing, facilitating filling and pouring operations, and insuring the proper cleaning of the agitator coincident with the cleaning of the receptacle.

Another object of the invention is to provide a drink mixer of this type in which the agitator shaft extending permanently within the receptacle is provided with a stirring element arranged close to the bottom and side walls of the receptacle, the bottom portion of the receptacle being not greatly larger than the stirring element, thus securing an effective mixing of the heavier ingredients such as certain syrups which would otherwise merely settle, and also obtaining quicker mixing since the swirling liquid at the small bottom portion of the receptacle is brought more frequently into contact with the stirring element.

A further object of the invention is to provide a drink mixer in which the motor and agitator are permanently secured to the receptacle by a bracket forming a handle by which the device is tilted for pouring the contents of the receptacle.

A further object of the invention is to provide a drink mixer in which the receptacle has a base equipped with an electrical connector for the motor, there being a stand for supporting the receptacle base and having an electrical connector releasably engageable with the base connector for supplying current to the motor, contact being established between the connectors either by a vertical motion of the receptacle base or by a rotary motion of the receptacle base about an upright axis.

A further object of the invention is to perfect details of construction generally.

This application constitutes a continuation in part of my co-pending application for Letters Patent for Drink mixers, Serial No. 476,027, filed August 18, 1930.

In the accompanying drawing, Fig. 1 is a sectional elevation of a drink mixer embodying the invention;

Fig. 2 is a fragmentary top plan view of the mixer stand and its electrical connector, and Fig. 3 is a view of the mixer as it appears when removed from its stand and when held in a tilted pouring position.

In the drawing, the numeral 10 designates an annular base in the form of an inverted cup, the lower edge portion of the base being provided with a rubber ring 11 to avoid marring a supporting surface on which the base is rested. A seat or socket 12 having sloping walls is formed in the base 10 to wedgingly receive therein the tapered lower side walls of a conically formed mixing cup or receptacle 13.

A bracket 14 has an arm 15 near its upper portion provided with a downwardly opening notch or channel 16 within which fits the upper edge of the receptacle 13. The bracket is provided with a curved handle portion 17 spaced from the receptacle and having a vertically extending lower end portion 18 which slidably fits within a vertical bore 19 formed in the upper wall of the base 10. The lower end portion 18 of the bracket is exteriorly threaded and receives thereon a clamping nut 20 to secure the bracket to the base and to permanently clamp the receptacle 13 between the base and the bracket arm 15. A washer 21 slidably fits about the lower end portion 18 of the bracket and rests on the top wall of the base 10.

An electric motor 22 is fastened to the upper end portion of the bracket 14 and drives a rotary agitator shaft 23 which extends into the receptacle and carries an agitator or stirring element 24 at its lower end. The shaft 23 may form an integral part of the armature shaft. The agitator shaft is disposed adjacent and substantially parallel to the side wall of the receptacle so as to permit free access to the upper end of the receptacle for filling the receptacle and pouring the contents thereof. The stirring element 24 extends close to the bottom wall of the receptacle to insure effective stirring of heavy ingredients, and the bottom portion of the receptacle is of relatively small diameter, so that the swirling of the mixture during mixing will bring the ingredients frequently into contact with the stirring element to obtain rapid and efficient mixing.

The handle portion 17 of the bracket is hollow and is cast about a metal tube 25 which forms a conduit for a pair of conductors 26 extending through the handle and connected to the motor. The lower ends of the conductors are connected to a pair of spaced vertical contact pins 27 mounted in an insulating member 28 which is secured to the base by a screw 29 depending from the top wall of the base.

The contact pins 27 project downwardly and are adapted to releasably engage a pair of forked resilient contact members 30 mounted in an insulating block 31 secured in a stand 32. Line conductors 33 are connected to the forked contact members 30 and pass through an opening 34 in the side walls of the stand. The stand 32 is provided in its bottom with a rubber ring 35 by which it may be set on a soda fountain back bar, counter, or other support without danger of marring finished surfaces. An upwardly projecting circular flange 36 is formed on the stand 32 to position the base 10 therein against lateral shifting. The base 10, however, is rotatable within the flange 36 so as to bring the contact pins 27 into engagement with the forked contact members 30 from either side, and for this purpose the insulating block 31 is provided with horizontal guide channels 37 opening at opposite ends. The forked contact members 30 are divergent both upwardly and laterally, so that the contact pins 27 may be set directly thereon from above as the base is lowered onto the stand, or may engage the contact members laterally from either side as the receptacle is rotated about a vertical axis while resting on the stand. In this manner, the receptacle base may be set on the stand in any position and then be rotated to bring the electrical connectors into engagement for supplying current to the motor.

When a drink is to be mixed, the mixer is lifted from the stand 32 and the desired ingredients are introduced into the receptacle from faucets and other dispensing devices. The motor is mounted well to one side of the receptacle so that it offers no obstruction to the introduction of materials into the receptacle. The drink mixer is then carried to the stand 32 and set thereon to operate the motor. If the contact pins 27 engage the forked contact members 30 from above, the motor will start at once. If the motor does not start, it is only necessary to rotate the base on the stand until the contact members are in engagement. A preliminary position of the contact pins 27 is shown in dotted lines in Fig. 2 before entering the guide channels to engage the contact members 30. After the motor is set in operation, the agitator quickly and thoroughly mixes the ingredients and, if desired, additional ingredients may be introduced during the mixing operation. Heavy ingredients, such as certain syrups, gravitate to the bottom of the receptacle but are not permitted to settle since the stirring element 24 is located at this point and thoroughly incorporates such ingredients in the drink. After the mixing is completed, the mixer is lifted by its handle from the stand 32 and is tilted, as shown in Fig. 3, for pouring the contents into a glass 38 or other container. After pouring the ingredients, the mixer may be set on the back bar or counter, or may be set back on the stand 32 with the electrical connectors out of contact.

For cleaning the mixer, it is only necessary to place a quantity of water in the receptacle and operate the motor, thus cleaning both the receptacle and the agitator. Since the agitator is permanently mounted within the receptacle, the act of cleaning the receptacle will necessarily clean the agitator, thus insuring a sanitary condition of the mixer and preventing attempts to wipe the agitator which might cause bending of the agitator shaft and thus produce vibration and rapid wear of motor bearings.

The permanent mounting of the motor and the agitator shaft supported and driven thereby with respect to the receptacle prevents striking of the agitator against the receptacle, thus avoiding mechanical injury to the agitator and motor bearings preventing marring of the smooth interior surface of the receptacle, and avoiding objectionable chipping of metal particles which might be deposited in the drink being mixed. The permanent position of the agitator within the receptacle also permits the stirring element to be placed close to the side and bottom walls of the receptacle without danger of striking the receptacle, thus insuring rapid and efficient mixing. Since the motor is permanently assembled with the agitator and receptacle, the agitator can be supported solely from the motor, thus avoiding the use of agitator shaft bearings within the receptacle which cannot be properly lubricated and are therefore subject to rapid wear, causing vibration, reduced agitator efficiency, and deposit of metal particles in the drink being mixed.

Since the motor is permanently associated with the receptacle, the drink mixer can be made of compact construction, light weight, and reduced height. The bottom of the receptacle can be placed quite close to the support on which the drink mixer rests, and because of the reduced height of the device stability is secured without requiring a massive base, such as is necessary in a drink mixer of conventional construction.

The term "permanent" as herein used with respect to the attachment of the receptacle to the motor refers to the relation of the parts existing in the normal use of the drink mixer, although the parts may be separably connected for the purpose of assembly in manufacture.

What I claim as new and desire to secure by Letters Patent is:

1. In a drink mixer, the combination of a cup member having a base, a hollow handle on said cup member, a motor mounted on the upper portion of said handle, an agitator driven by said motor and permanently positioned within said cup member, electrical conductors for the motor extending through said handle, contact members connected to said conductors adjacent the lower portion of said cup member, a support on which said base is releasably rested, and an electrical connector on said support releasably engageable with said contact members and forming therewith a service switch for controlling the flow of current to the motor.

2. In a drink mixer, the combination of a cup member having a base, a hollow handle secured at its lower end to said base and at its upper portion to the upper part of said cup member, a threaded clamping member engageable with the lower end of said handle for fastening said cup member to said base, a motor mounted on said handle, an agitator driven by the motor and permanently positioned within the receptacle, and conductors for the motor extending within said hollow handle.

3. In a drink mixer, the combination of a cup member having a base, a motor and agitator driven thereby permanently associated with said cup member, contact members carried by said base and having an electrical connection with said motor, a stand releasably supporting said base, said base and stand having interengaging parts preventing lateral shifting of said base and defining an axis of rotation for said base, and contact members mounted on said stand and releasably engageable with said base contact members to form therewith a service switch for controlling the flow of current to the motor, said co-operating contact members being disposed for engagement by the rotation of said base on said stand.

4. In a drink mixer, the combination of a cup member having a circular base, a motor and agitator driven thereby permanently associated with said cup member, contact members carried by said base and having an electrical connection with said motor, a stand releasably supporting said base and having an upstanding annular flange confining said base therein against lateral shifting and defining an axis of rotation for said base, and contact members carried by said stand and releasably engageable with said base contact members to form a service switch for controlling the flow of current to the motor, said co-operating contact members being disposed for engagement by the rotation of said base on said stand.

5. In a drink mixer, the combination of a cup member having a base, a motor and agitator driven thereby permanently associated with said cup member, contact members carried by said base and having electrical connection with said motor, a stand releasably supporting said base, means for defining an axis of rotation for said stand-supported base, and contact members carried on said stand in position to be engaged by said base contact members when the base is rotatably shifted on said stand, said co-operating contact members forming a service switch for controlling the motor current.

In testimony whereof I affix my signature.
ROYAL A. BEACH.